Jan. 26, 1932.  A. Y. DODGE  1,842,899
BRAKE
Filed Dec. 15, 1927

INVENTOR
ADIEL Y. DODGE
BY
ATTORNEY

Patented Jan. 26, 1932

1,842,899

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE

Application filed December 15, 1927. Serial No. 240,242.

This invention relates to brakes, and is illustrated as embodied in novel operating mechanism for a front-wheel automobile brake. An object of the invention is to provide simple operating means which will not interfere with swiveling the wheel. Preferably this includes a simple tension member, such as a cable, passing from an idler pulley (or other direction-changing element) on the axle upwardly at an acute angle to the swiveling axis of the wheel, and connected at its end to a brake-applying lever or the like by a joint which travels approximately along the swiveling axis in applying the brake, and which joint is arranged in or immediately adjacent that axis when the brake is applied.

I prefer that the joint be arranged, when the brake is applied, slightly at one side of the swiveling axis, so that swiveling the wheel to place it on the outside of a turn will relieve the tension of the cable or its equivalent, to avoid the possibility of locking the wheel and thus robbing it of its directional characteristics. It is best, also, to have the joint somewhat behind the swiveling axis, so that the relief of the outer brake will cause a minimum tightening of the inner brake.

The above and other objects and features of the invention, including various novel and desirable details of construction, will be apparent from the following description of the illustrative embodiments shown in the accompanying drawings, in which.

Figure 1:
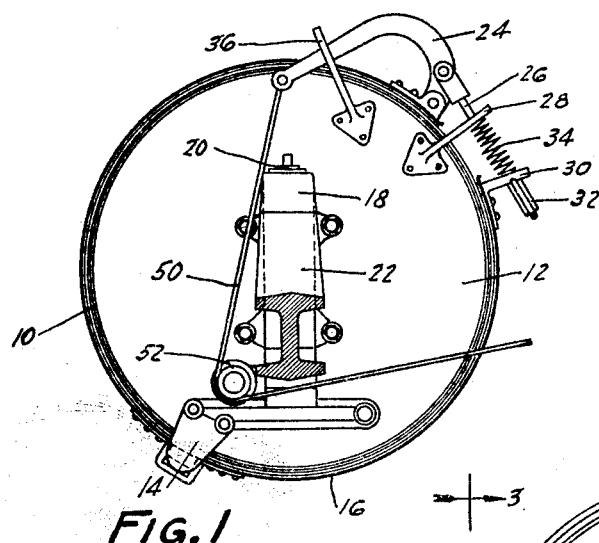
Figure 1 is a vertical section through the front axle, looking outwardly from the center of the car toward the right front brake, which is shown in inside elevation.

In the arrangement of Figure 1, the brake includes a rotatable drum 10, secured to the right front wheel (not shown), at the open side of which drum is a stationary supporting plate 12 on which is anchored at 14 an external contracting brake band 16 surrounding the drum. The wheel and drum are rotatably mounted on a knuckle 18 which is swiveled, by means of a king-pin 20 or the like, at the end of the front axle 22.

The brake is operated by a lever 24 pivoted to one end of the band 16, and having a link 26 passing through a stationary support 28, which is riveted to plate 12, and connected to a lug 30 on the other end of band 16 by an adjustable nut 32. A spring 34 is sleeved on link 26, and is confined under compression between support 28 and lug 30. A slotted guide 36 riveted to the backing plate 12 embraces the operating lever 24.

Figure 2:
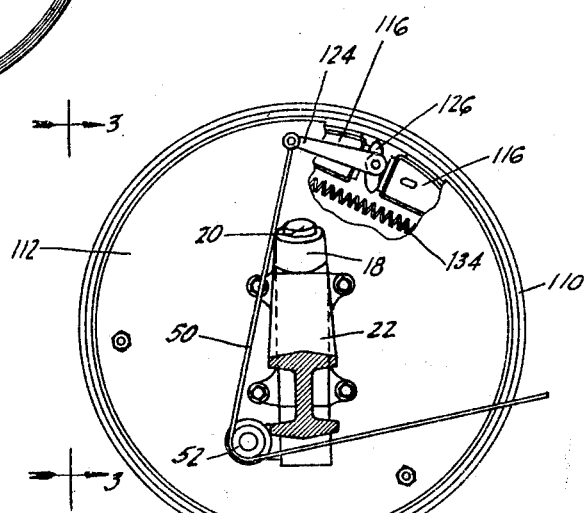
Figure 2 is a figure corresponding to Figure 1, but showing an internal instead of an external brake.
Figure 3:
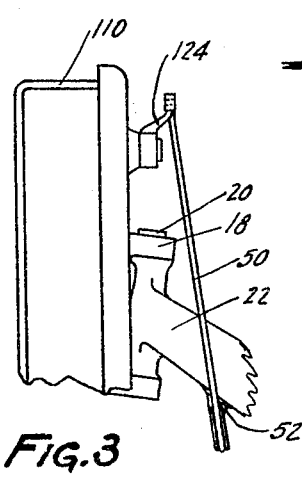
Figure 3 is a front elevation of the upper portion of the parts shown in Figure 2, and looking in the direction of the arrows 3—3 in Figure 2.

The arrangement of Figures 2 and 3 differs from that just described, in that the drum 110 and backing plate 112 serve to house an internal expanding brake which may include shoes 116 operated by a cam 126 or the like, against the resistance of a return spring 134. Cam 126 may be operated by means such as a lever 124 secured to its cam shaft.

In either case, according to an important feature of the invention, lever 24 or 124 (or a corresponding brake-operating device) is operated by a tension element, such as a cable 50, connected to the end of the lever in a joint which moves approximately in the direction of the swiveling axis in applying the brake. The tension element 50 may extend downwardly, at an acute angle to the swiveling axis, to an idler part on the axle, such as a pulley 52 or an equivalent direction-changing element, and in the illustrated arrangement is then extended rearwardly to form part of a system of unequalized brake-operating connections controlled by the driver.

Figure 4:
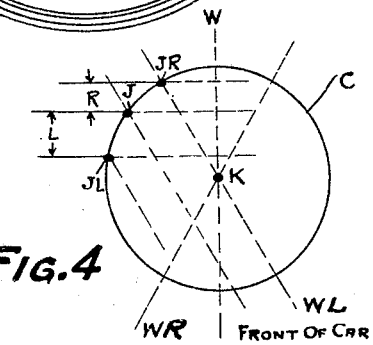
Figure 4 is a diagram corresponding to a top plan view of either Figure 1 or Figure 2, and illustrating the relief in pressure on the outer brake in rounding a corner.

When an arrangement providing for the relief of the outer brake on a corner is desired, I prefer to arrange the joint between the tension element 50, and the lever 24 or 124, some 3/16 inch from the swiveling axis when the brake is applied, on the same side as the wheel, and about the same distance behind the swiveling axis, with the result illustrated in the diagram of Figure 4.

Figure 4 corresponds to a top plan view of either Figure 1 or Figure 2, with the front of the car at the bottom of the figure, and the wheel some distance to the left of the figure and therefore not indicated. "W" is a line parallel to the wheel when the car is moving straight ahead; "WR" is a corresponding line when the wheel is swiveled to the right (as regarded by the driver); and "WL" is a similar line with the wheel swiveled to the left. These three lines intersect at "K", which represents the axis of king-pin 20 (i. e., the swiveling axis of the wheel). The position of the joint between member 50 and lever 24 or 124, with the wheel in the three positions indicated by the lines "W", "WR", and "WL", and with the brake applied, is indicated by the dots "J", "JR", and "JL" respectively.

It will be seen that the movement of the joint through the distance "L" from "J" to "JL", when the wheel is turned to place it on the outside of a turn, is relatively great and is in a direction to relieve the tension on element 50, and therefore to relieve the pressure on the brake. On the other hand, when the wheel is swiveled the other way to place it on the inside of a turn, the distance "R" lengthwise of the car which the joint moves from "J" to "JR", while in a direction to tighten the brake, is comparatively small.

While two illustrative embodiments have been described in detail, it is not my intention to limit the scope of the invention to those particular embodiments, or otherwise than by the terms of the appended claims. The present application is in part a continuation of my application No. 697,981, filed March 10, 1924.

I claim:

1. A vehicle having an axle and a brake swiveled by a pivot connection at the end of the axle, in combination with brake-applying means comprising an operating device swiveling with the brake and arranged at the top of the brake and arranged to travel approximately in the direction of the swiveling axis in applying the brake, a direction-changing element on the axle, and a tension member connected to said operating device and passing downwardly at an acute angle to the swiveling axis and at one side of the pivot connection and passing over said element.

2. A vehicle having an axle and a brake swiveled by a pivot connection at the end of the axle, in combination with brake-applying means comprising an operating lever swiveling with the brake and arranged at the top of the brake and having its end arranged to travel in an arc extending approximately in the direction of the swiveling axis in applying the brake, a direction-changing element on the axle, and a tension member connected to the end of the lever and passing downwardly at an acute angle to the swiveling axis and at one side of the pivot connection and passing over said element.

3. A vehicle having an axle and a brake swiveled by a pivot connection at the end of the axle, in combination with a brake-applying means comprising an operating device swiveling with the brake and arranged at the top of the brake and arranged to travel approximately in the direction of the swiveling axis in applying the brake, an idler part carried by the axle, and a tension member connected to said operating device and passing downwardly at an acute angle to the swiveling axis and at one side of the pivot connection to said idler part.

4. A vehicle having an axle and a brake swiveled by a pivot connection at the end of the axle, in combination with brake-applying means comprising an operating lever swiveling with the brake and arranged at the top of the brake and having its end arranged to travel in an arc extending approximately in the direction of the swiveling axis in applying the brake, an idler part carried by the axle and at one side of the pivot connection, and a tension member connected to the end of said lever and passing downwardly at an acute angle to the swiveling axis to said idler part.

5. A vehicle having an axle and a brake swiveled at the end of the axle, in combination with brake-applying means comprising an operating device swiveling with the brake and arranged at the top of the brake and arranged to travel approximately in the direction of the swiveling axis in applying the brake, an idler part carried by the axle, and a tension member connected to said operating device and passing downwardly at an acute angle to the swiveling axis to said idler part, the joint at the upper end of the tension member being arranged, when the brake is applied, slightly at one side of the swiveling axis, so that swiveling the brake to place it on the outer side of a turn automatically modifies the tension on said member.

6. A vehicle having an axle and a brake swiveled at the end of the axle, in combination with brake-applying means comprising an operating lever swiveling with the brake and arranged at the top of the brake and having its end arranged to travel in an arc extending approximately in the direction of the swiveling axis in applying the brake, an idler part carried by the axle, and a tension member connected to the end of said lever and passing downwardly at an acute angle to the swiveling axis to said idler part, the joint at the upper end of the tension member being arranged, when the brake is applied, slightly at one side of the swiveling axis, so that swiveling the brake to place it on the outer side of a turn automatically modifies the tension on said member.

7. A vehicle having an axle and a brake swiveled at the end of the axle, in combination with brake-applying means comprising an operating device swiveling with the brake and arranged at the top of the brake and arranged to travel approximately in the direction of the swiveling axis in applying the brake, an idler part carried by the axle, and a tension member connected to said operating device and passing downwardly at an acute angle to the swiveling axis to said idler part, the joint at the upper end of the tension member being arranged, when the brake is applied, slightly at one side of the swiveling axis and slightly spaced from the swiveling axis lengthwise of the car, so that swiveling the brake through a given angle to place it on the outer side of a turn modifies the tension on said member to a considerable degree, while swiveling the brake through the same angle in the opposite direction modifies the tension on said member very slightly.

In testimony whereof I have hereunto signed my name.

ADIEL Y. DODGE.

CERTIFICATE OF CORRECTION.

Patent No. 1,842,899.  January 26, 1932.

ADIEL Y. DODGE.

It is hereby certified that error appears in the printed specification of the above numbered patent requiring correction as follows: Page 2, lines 92 and 93, claim 4, strike out the words "and at one side of the pivot connection" and insert the same to follow the word "axis" in line 95; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.